E. H. GRAFTON AND F. CRAWFORD.
ANTIFRICTION BEARING FOR LEAF SPRINGS.
APPLICATION FILED JUNE 23, 1919.
1,365,240.
Patented Jan. 11, 1921.
2 SHEETS—SHEET 1.
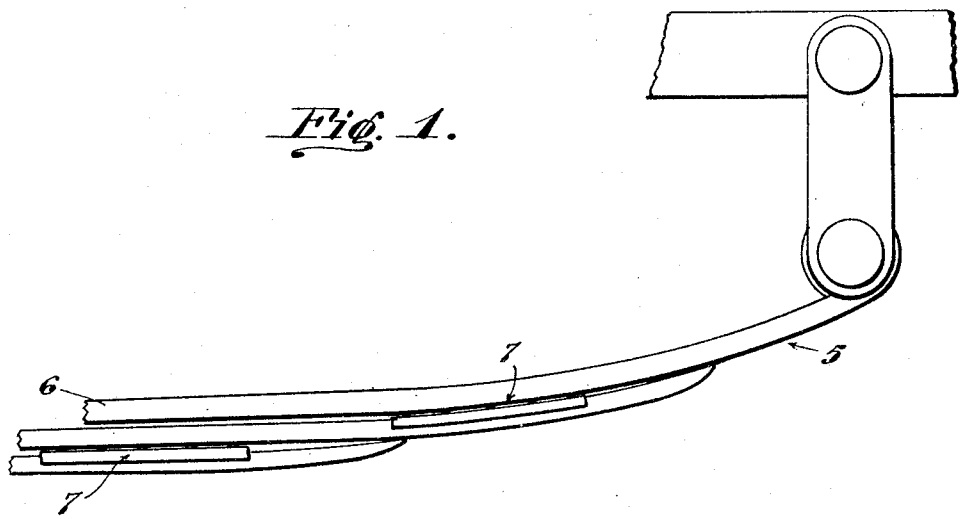
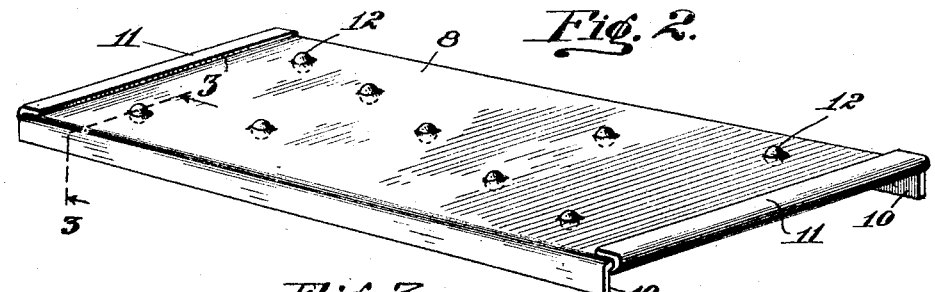
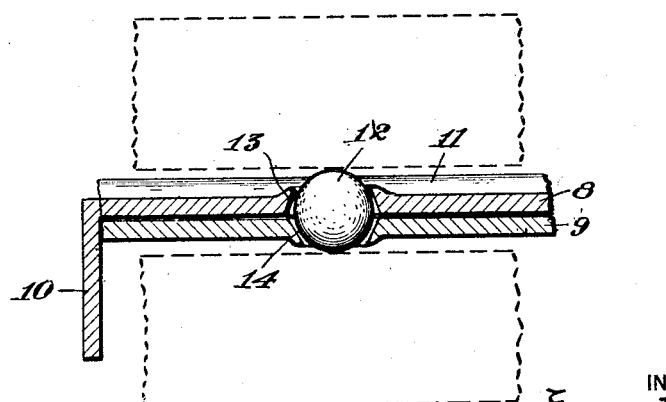

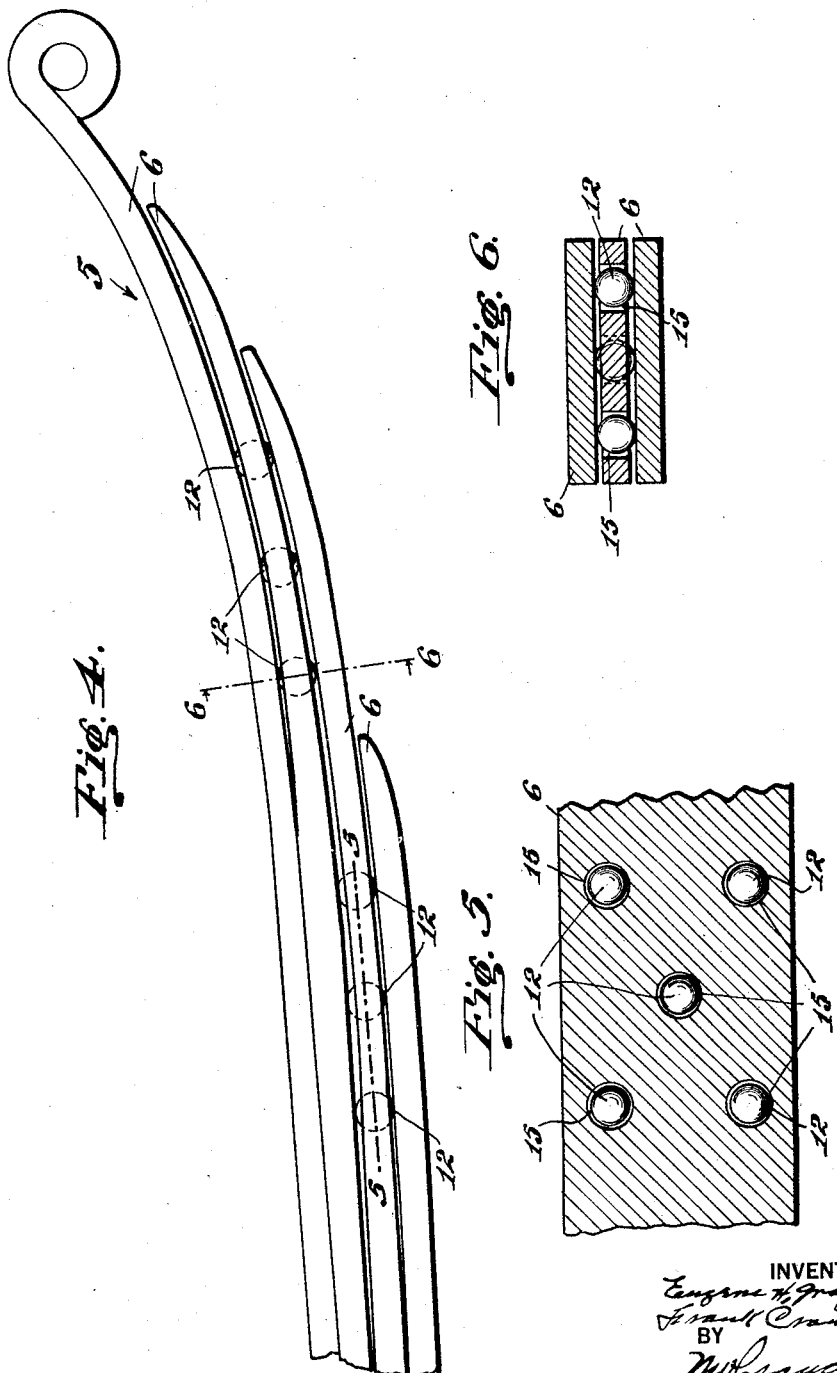

UNITED STATES PATENT OFFICE.

EUGENE H. GRAFTON, OF LOS ANGELES, AND FRANK CRAWFORD, OF TORRANCE, CALIFORNIA.

ANTIFRICTION-BEARING FOR LEAF-SPRINGS.

1,365,240.   Specification of Letters Patent.   Patented Jan. 11, 1921.

Application filed June 23, 1919. Serial No. 306,184.

*To all whom it may concern:*

Be it known that we, EUGENE H. GRAFTON and FRANK CRAWFORD, citizens of the United States, residing, respectively, at Los Angeles and Torrance, in the county of Los Angeles and State of California, have invented new and useful Improvements in Antifriction-Bearings for Leaf-Springs, of which the following is a specification.

This invention relates to a leaf spring and particularly pertains to a device for reducing friction between the overlapping members of a leaf spring of the laminated elliptic or semi-elliptic types.

It is the object of this invention to provide a device of the above character embodying a plurality of ball bearings adapted to be interposed between contiguous overlapping plate spring members, which is simple and economical in construction and which may be readily applied to the ordinary leaf springs commonly employed on auto vehicles and the like.

Another object is to provide a construction in a device of the above named class by which it will be securely held in position between adjacent members of the spring without being connected thereto by screws, pins, or similar fastenings.

Other objects will appear hereinafter.

The invention is illustrated in the accompanying drawings in which:

Figure 1, is a view, showing the invention as applied;

Fig. 2, is a view in perspective of the bearing device;

Fig. 3, is a view in section on the line 3—3 of Fig. 2.

Fig. 4, illustrates a modification of the invention.

Fig. 5, is a view in section on the line 5—5 of Fig. 4.

Fig. 6, is a view in section on the line 6—6 of Fig. 4.

More specifically, 5 indicates a leaf spring, which may consist of any desired number of overlapping plate spring members 6.

The present invention particularly resides in interposing a friction reducing bearing 7 between the contiguous spring members 6; the bearings being disposed adjacent to the ends of the spring members and at the point of the greatest movement of the spring members relative to each other when the spring is flexed.

In carrying out the invention a pair of thin sheet metal plates 8 and 9 are provided one of which is formed with longitudinally extending flanges 10 on its opposite edges; the flanges 10 being spaced apart a distance substantially equal to the width of the spring member 6 so that when the bearing member is interposed between the spring members the flanges 10 will project alongside the edges thereof to hold the bearing member against sidewise displacement. The flanges are here shown as formed on the plate 8. The plate 9 is of a width substantially corresponding to the space between the side flanges on the plate 8 and is designed to extend over the plate 8 between the flanges and securely held in place thereon. The connection between the plates 8 and 9 is here shown as effected by turning the ends of the plate 9 over the ends of the plate 8 forming inturned end flanges 11 on the ends of the plate 9 engaging the end edges of the plate 8 between the flanges 10, as particularly shown in Fig. 2.

The plates 8 and 9 form a mounting for a series of ball bearings 12 which are held in place on the plates in such manner as to project from the opposite sides thereof; the balls 12 being of such diameter as to slightly exceed the combined thickness of the three layers formed at the ends of the bearing member by the plates 8 and 9 and the inturned flanges 11.

The manner of mounting the balls on the plates is particularly shown in Fig. 3 and consists in forming the plates with registering openings 13 and 14 having oppositely beveled walls converging from the adjacent faces of the plates. The inner margins of the openings are of a diameter greater than the diameter of the ball and the outer diameters of the openings are less than the diameter of the ball, so that when the latter is disposed within the openings it will be loosely held in place and carried by the plates. Any suitable number of the ball bearings may be employed as occasion may require, and they may be disposed in any desired arrangement on the plates; they being here shown as arranged in crossed oblique rows. In assembling the balls, they are placed in the openings of one of the plates and the other plate is positioned over the plate carrying the balls, and is joined thereto as before described.

In the application of the invention, the end portions of the overlapping spring members are spread apart with a suitable tool, and the bearing member carrying the balls is placed between the springs, so that adjacent faces of the contiguous springs will be spaced apart by and bear upon the ball bearings. The flanges 10 grip the edges of a spring member sufficiently to hold the plates against longitudinal movement and also prevent sidewise displacement thereof.

In the modified form of the invention shown in Figs. 4, 5, and 6, a simple embodiment of the invention is disclosed, in which the ball bearings are mounted directly in, and carried solely by the plate spring members, the latter being formed with openings 15 in which the ball bearings are loosely disposed as particularly shown in Figs. 5 and 6. In this construction, the ball bearings are formed of a diameter slightly greater than the thickness of the spring members to space the latter apart, and afford a rolling contact therebetween.

In operation, on flexing the springs in either direction, the spring members move longitudinally relative to each other, and by reason of the rolling contact afforded by the ball bearing, friction and consequent wear between the contiguous spring members is reduced to a minimum.

While the invention has been described in a specific embodiment, it is manifest that various modifications may be made in the details of construction without departing from the spirit and scope of the invention as set forth in the appended claims.

We claim:

1. The combination of a pair of overlapping plate spring members, a pair of connected plates interposed between said plate spring members having a series of registering openings, ball bearings mounted in said openings to project from the opposite sides of said plates and contact the contiguous faces of the plate spring members, and means for holding said plates against longitudinal and transverse movement relative to said spring members.

2. The combination of a pair of overlapping plate spring members, a pair of connected plates interposed between said plate spring members having a series of registering openings, ball bearings mounted in said openings to project from the opposite sides of said plates and contact the contiguous faces of the plate spring member, and flanges carried by said plates for holding said plates against longitudinal and transverse movement relative to said spring members.

3. In a leaf spring, the combination of a series of overlapping plate spring members, a pair of connected sheet metal plates adapted to be interposed between said plate spring members and a series of ball bearings mounted on said plates to contact the contiguous faces of the plate spring members.

EUGENE H. GRAFTON.
FRANK CRAWFORD.